Patented July 25, 1944

2,354,427

UNITED STATES PATENT OFFICE 2,354,427

METHOD OF TREATING MERCAPTOTHI-AZOLES WITH AMMONIA DERIVATIVES AND PRODUCT PRODUCED THEREBY

Edward L. Carr, Akron, Ohio, assignor to The Firestone Tire & Rubber Company, Akron, Ohio, a corporation of Ohio No Drawing. Application December 13, 1940,
Serial No. 369,988

8 Claims. (Cl. 260—306.6)

This invention relates to an improved method of treating mercaptothiazoles with ammonia derivatives and more particularly to an improved method of oxidizing a mixture of a 2-mercaptothiazole and ammonia or mono-substituted ammonia.

This application is a continuation in part of my application Serial No. 259,712, filed March 3, 1939, Patent 2,271,834.

An unusual class of organic chemical compounds containing both nitrogen and sulfur may be prepared by oxidizing a mixture of a 2-mercaptothiazole and an appropriate ammonia derivative. The chemical structure of the organic chemical product of this reaction is not definitely known, but it is believed to be a derivative of thiohydroxylamine (HSNH$_2$). Thus, as an example, the oxidation of a mixture of 2-mercaptobenzothiazole and piperidine gives rise to a white crystalline organic compound melting at 80° C. This substance is believed to be N-pentamethylene, S-2-benzothiazyl thiohydroxylamine of the following structure:

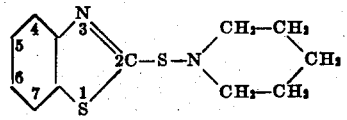

It has heretofore been proposed to prepare compounds having structures similar to that of the above example by heating together dibenzothiazyl disulfide and a secondary amine. A white crystalline product melting at 80° C. is obtained when the amine employed is piperidine. It has also been proposed to prepare the same type of compound by allowing the sodium salt of 2-mercaptobenzothiazole and the N-chloro derivative of a secondary amine to interact. Thus, by the use of N-chloro piperidine there is also produced a white crystalline substance melting at 80° C. The reaction products obtained by each of the three above-mentioned reactions are identical.

However, other structures are possible for this class of reaction products. For example, the above-mentioned reaction product of mercaptobenzothiazole and piperidine might possibly be a derivative of hydrazine, of the structure:

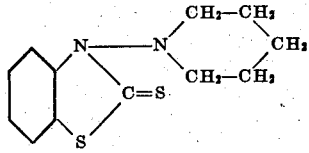

Appreciation of the fact that the two above-mentioned prior methods of producing the type of compounds discussed are rather expensive and are otherwise commercially impracticable has led to a study of other possible methods for preparing said compounds. Experiments have indicated that, although the oxidation of a mixture of a mercaptothiazole and an appropriate ammonia derivative generally produces some of the desired compound, quantitative results have not been obtained under all conditions. Especially, it has been found that the use of one of the cheapest oxidizing agents known, chlorine, produces very low yields when ordinary reaction conditions are employed.

After an extensive study of the oxidation reaction, it has now been found possible to use chlorine and yet obtain substantially quantitative yields of the practically pure desired products. It is desirable to employ at least two equivalents of an alkali to each equivalent of the mercaptothiazole in aqueous solution and to aid in the oxidation reaction itself. The use of at least two equivalents of the ammonia derivative is preferred in order completely to prevent the formation of a dithiazyl disulfide by the oxidation of two molecules of the mercaptothiazole. By means of the new method substantially quantitative yields of pure products may now, for the first time, be prepared very conveniently and at low cost.

Although it is desirable to employ at least two equivalents of an alkali for each equivalent of the mercaptothiazole, satisfactory results are also obtained with only one to two equivalents of alkali, providing that a corresponding increase in the ratio of ammonia derivative to mercaptothiazole is used. Thus, excellent yields are obtained from one equivalent of the mercaptothiazole, one equivalent of an alkali and at least three equivalents of the ammonia derivative. When chlorine is replaced by an alkali hypohalite identical results are obtained with one equivalent of alkali and two equivalents of the ammonia derivative.

However, the present invention contemplates the use of smaller ratios of alkali to mercaptothiazole than the preferred ratios disclosed above. By means of the present method useful results are obtainable so long as the reaction solution is maintained in a distinctly alkaline condition.

A primary object of the present invention is to provide an improved method of oxidizing a mixture of a 2-mercaptothiazole and an ammonia derivative.

Another object is to provide a commercial method of oxidizing a mixture of a 2-mercaptothiazole and ammonia or a mono-substituted ammonia to produce certain nitrogen and sulfur containing compounds at a much lower cost than heretofore possible.

Another object is to provide a method of oxidizing a mixture of a 2-mercaptothiazole and an ammonia derivative, in aqueous solution, by the use of chlorine, bromine, iodine or a suitable hypohalite to produce a useful organic compound.

A further object is to provide certain new organic compounds containing both nitrogen and sulfur and to provide an efficient method for preparing them.

Broadly stated, the present invention comprises treating an aqueous alkaline solution comprising a 2-mercaptothiazole and a suitable ammonia derivative with chlorine, bromine, or iodine. The invention also contemplates substituting for one of the above-named halogens hypochlorous, hypobromous or hypoiodous acid, or an alkali metal or alkaline earth metal salt of one of said acids.

It is believed that a thiohydroxylamine is formed according to the present method by the simultaneous oxidation of one molecule of a mercaptothiazole (Tz represents a thiazyl radical in equations below) and one molecule of ammonia (or a mono-substituted ammonia), as follows:

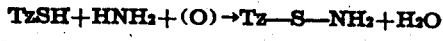

TzSH+HNH₂+(O)→Tz—S—NH₂+H₂O

When a halogen such as chlorine is employed as the reagent in practicing the present invention, the course of the reactions is believed to agree with the following equations:

2MOH+Cl₂→MOCl+MCl+H₂O
MOCl+TzSH+NH₂R→TzSNHR+H₂O+MCl

In the above equations and throughout the specification and claims "M" (or "alkali metal") refers to any one of the group including lithium, sodium, potassium, and ammonium. The broader term "alkali" is meant to include alkali metal or alkaline earth metal oxides or hydroxides, or the chemical equivalents of these substances, such as the alkali metal carbonates. Obviously, an alkali, such as sodium carbonate or calcium oxide (plus water if necessary), may replace the alkali metal hydroxide of the first equation.

The ammonia derivative in the above equation is represented as NH₂R, in which R may be hydrogen, an alkyl radical or a substituted alkyl radical.

According to the above equations it will be seen that chlorine is thought to react first with the alkali present in the water solution to form an alkali metal hypochlorite. This latter compound is then the effective oxidizing agent for the main reaction, indicated in the second equation. For the purposes of the present invention, the step outlined in the first equation given above may be clearly eliminated and the method practiced by merely adding a hypochlorite to an aqueous solution comprising the mercaptothiazole and the ammonia derivative. In other words, it makes no substantial difference whether the hypohalite, necessary to the reaction, is formed in the reaction solution or is preformed and then added thereto. The choice of oxidizing reagent from the group mentioned above is dependent entirely on considerations of convenience or cost.

Ammonia derivatives contemplated as operable in the present method include, generally, compounds of the formula, NH₂R, in which R is hydrogen or, in general terms, a primary alkyl radical. Two types of ammonia derivatives are thus contemplated.

First, ammonia itself is represented when R of the formula, NH₂R is hydrogen.

Second, a mono-substituted ammonia of the primary amine type is represented by the general formula when the R is a radical derived from a hydrocarbon, such that R is not an aryl radical. Examples of the type of mono-substituted ammonia derivatives contemplated by the present invention are the following primary alkyl amines and substituted alkyl primary amines: methyl amine, ethyl amine, propyl amines, butyl amines, amyl amines, hexyl amines, cyclohexylamine, benzyl amine, and such poly-amines as ethylene diamine. A radical such as the cyclohexyl is herein considered to be a polymethylene substituted alkyl radical.

An ammonia derivative containing less than ten carbon atoms is preferred for solubility reasons, but the invention is not limited thereto.

The following examples are given as illustrative of the invention, but not in limitation thereof.

*Example 1*

A reaction mixture was prepared containing 1600 grams of mercaptobenzothiazole, 960 grams of sodium hydroxide and 2440 grams of cyclohexylamine in a total volume of 48 liters. The molecular ratio of these reagents is: 1 mercaptobenzothiazole to 2.5 NaOH to 2.5 RNH₂. This ratio of reactants represents an excess of both alkali and amine over the amounts required by the stoichiometric equation:

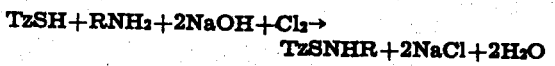

TzSH+RNH₂+2NaOH+Cl₂→
TzSNHR+2NaCl+2H₂O

Excess of amine is employed in order to favor by means of mass action the coupling of mercaptobenzothiazole with the amine rather than with itself to form dibenzothiazyl disulfide. After the completion of the reaction the unused amine may be readily recovered by any suitable method, such as by salting it out of the solution. Excess of alkali is employed to facilitate absorption of chlorine toward the end of the reaction.

The reaction mixture, initially at 14° C., was contained in an iron drum which was fitted with eight glass nozzles extending almost to the bottom of the solution. The depth of the solution was 30 cm.

The reaction was carried out as follows: Into the well stirred solution was passed by means of the nozzles a mixture of chlorine and air at the rate of 240 grams of chlorine per hour for three hours. The product precipitated concurrently with the introduction of chlorine. After three hours the solution was depleted of mercaptobenzothiazole, as shown by acidifying a filtered sample of the solution.

The crystalline product, believed to be N-cyclohexyl, S-2-benzothiazyl thiohydroxylamine of the structure

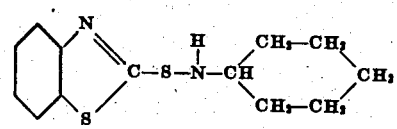

was collected, washed with water and dried. Without further purification it had a melting range of 93–99° C. The yield was practically quantitative on the basis of the mercaptobenzothiazole. A 7.5 per cent excess of chlorine was passed into the solution. During the course of the reaction the temperature gradually rose to 29° C. The chlorine-air mixture consisted of approximately 1 part of chlorine to from 10 to 20 parts of air.

Although the concentration of cyclohexylamine may vary greatly without substantially diminishing the success of the present method, it has been ascertained that a range of 30 to 100 grams of the amine per liter of the reaction solution, in this instance, favors the production of a purer product and a higher yield than is otherwise obtainable.

Example 2

The following semi-continuous procedure permits obtaining the equivalent of several batches of product from a limited volume of solution. In other words, this procedure makes it possible to start with a batch preparation, such as is described in Example 1 and later examples, and modify the preparation so as to produce several times the amount of product produced by a single batch preparation, without increasing the volume of the reaction mixture beyond the capacity of the vessel suited to the batch preparation. The modification in procedure consists essentially in renewing the reactants as the reaction proceeds until either the volume of solution becomes too large for the reaction vessel or the concentration of the halide salt produced by the reaction becomes sufficiently great to salt out the amine reactant. In the specific procedure described in this example, a quantity of the desired reaction product equal to that produced in nine separate batch preparations is obtained with only a one-fold increase in the volume of the reaction mixture.

A starting reaction mixture (a unit batch) is prepared exactly as in Example 1 in a similar iron drum. The mixture is cooled externally with tap water to 14-19° C. in order to prevent the heat of reaction from warming the mixture to a temperature above 30° C. The reaction mixture is stirred rapidly, and a mixture of chlorine and air containing approximately one volume of chlorine to ten volumes of air is passed thereinto through glass nozzles as in Example 1. The rate of flow of chlorine is adjusted to 9-11 ounces per hour.

After the chlorine has been introduced for an hour, during which time the conversion of the reactants of the initial batch to the desired product is approximately one-third completed, additional 2-mercaptobenzothiazole, cyclohexylamine, and sodium hydroxide are introduced into the reaction mixture.

The additional 2-mercaptobenzothiazole and sodium hydroxide are introduced in the form of an aqueous reactant solution 25 per cent in 2-mercaptobenzothiazole and 15 per cent in sodium hydroxide, which composition represents a ratio of one mole of the mercaptothiazole to two and one-half moles of the alkali. This solution is prepared by mixing equivalent quantities of the mercaptothiazole and sodium hydroxide in one-half the total amount of water required, to form a solution of the sodium salt of 2-mercaptobenzothiazole. A solution of one and one-half equivalents of sodium hydroxide in the remaining one-half of the total amount of water required is then mixed with the solution of the sodium salt to form a final reactant solution of the above composition. The specific gravity of this solution at 25° C. is approximately 1.23. This reactant solution is then added to the reaction mixture at the rate of approximately 1730 cubic centimeters per hour or 532 grams of the mercaptothiazole and 319 grams of sodium hydroxide per hour. Cyclohexylamine is concurrently added to the reaction mixture at an equivalent rate, or 367 cubic centimeters per hour. The introduction of chlorine is maintained at the rate of 9-11 ounces per hour, which is 7.5 per cent higher than the rate of addition of the other reactants, in order to allow for loss of chlorine by escape from the reaction mixture.

The process is continued until a quantity of 2-mercaptobenzothiazole equal to eight 1600 gram batches (together with sodium hydroxide and cyclohexylamine as above indicated) have been added to the original reaction mixture, totaling a quantity of mercaptobenzothiazole used equal to nine 1600 gram batches or 14,400 grams. The addition of reactants other than chlorine is then stopped, but the addition of chlorine is continued until the reaction mixture is depleted of the mercaptothiazole, as is apparent on acidifying a filtered portion of the mixture.

The desired product is separated from the reaction mixture by filtration. After being washed with water and dried, the product is obtained as a white to cream-colored solid melting in the approximate range of 88–90°. The yield amounts to 22,400 grams or 98 per cent of the theoretical for N-cyclohexyl, S-2-benzothiazyl thiohydroxylamine.

The semi-continuous procedure may obviously be slightly modified as to concentrations and proportions of reactants. For instance, satisfactory results are obtained with the use of only two moles of alkali per mole of mercaptothiazole in the added reactant solution. Other 2-mercaptothiazoles and ammonia derivatives may be substituted for the corresponding reactants in this example. Alternatively, chlorine may be substituted by an alkali hypochlorite, the latter being introduced in aqueous solution to the mixture; in this event, the above-described aqueous reactant solution containing one and one-half moles of sodium hydroxide may be conveniently replaced by an equivalent sodium hypochlorite solution and the latter added separately to the mixture, but concurrently with the mercaptothiazole salt solution.

Example 3

To 250 cc. of an aqueous solution containing 10 grams of mercaptobenzothiazole, 4.8 grams of sodium hydroxide and 24 grams of cyclohexylamine, there was slowly added with stirring a saturated aqueous solution of bromine. In the ensuing reaction the product precipitated as white crystals which, after being washed with water and dried, had a melting point of 100–101° C.

Example 4

A solution was prepared containing 10 grams of mercaptobenzothiazole, 4.8 grams of sodium hydroxide, and 17.8 grams of cyclohexylamine in a volume of 250 cc. To this solution there were added with stirring 200 cc. of an aqueous potassium iodide solution containing 15.3 grams of free iodine. The product precipitated in quantitative yield as white crystals of melting point 100° C.

Example 5

To 250 cc. of an aqueous solution containing 20 grams of mercaptobenzothiazole, 9.6 grams of sodium hydroxide and 48 grams of cyclohexylamine there was added with stirring a saturated aqueous solution of chlorine until the reaction mixture was depleted of mercaptobenzothiazole. The white crystalline product was removed from the solution, filtered and dried. Melting point 93° C. The yield was practically quantitative.

Example 6

An aqueous solution of sodium hypochlorite was introduced with stirring into 300 cc. of an aqueous solution containing 12.4 grams of the sodium salt of mercaptobenzothiazole and 24 grams of cyclohexylamine. White crystals precipitated, which, after being washed with water and dried, melted at 98–99° C.

Example 7

An aqueous solution of 300 cc. volume was prepared containing 10 grams of mercaptobenzothiazole, 4.8 grams of sodium hydroxide and 19 grams of benzylamine. Chlorine gas diluted with air was passed into the stirred solution until the mercaptobenzothiazole was depleted. The white crystalline product precipitated in practically quantitative yield. Melting point 115° C. The product is believed to be N-benzyl, S-2-benzothiazyl thiohydroxylamine of the structure

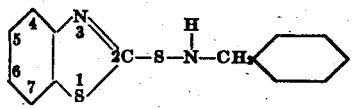

The above reaction product was proved to be identical with the reaction product formed by heating a mixture of dibenzothiazyl disulfide and benzylamine.

Example 8

To 100 cc. of a stirred solution containing 10 grams of mercaptobenzothiazole, 2.4 grams of sodium hydroxide and 30 grams of ethylene diamine there was slowly added with stirring a 5 per cent solution of sodium hypochlorite. The product precipitated as white crystals of melting point 115° C.

Example 9

An aqueous solution was prepared containing 10 grams of mercaptobenzothiazole, 4.8 grams of sodium hydroxide and 21 grams of mixed monoamylamines in a volume of 250 cc. To this solution there were added with stirring 200 cc. of a solution containing 15.3 grams of iodine and 16 grams of potassium iodide. The product was obtained as an oil, which, on being washed and dried, set to a semi-crystalline condition. The yield was practically quantitative. The product is believed to be a mixture of compounds of the structure

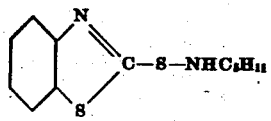

Example 10

A solution was prepared containing 10 grams of mercaptobenzothiazole, 2.4 grams of sodium hydroxide and excess concentrated ammonia in a volume of 100 cc. To this solution there was added with stirring a 10 per cent solution of sodium hypochlorite until the reaction mixture was depleted of mercaptobenzothiazole. The product was obtained in high yield as a white precipitate, which, after being washed with water and dried, melted at 125° C. The compound is believed to be S-2-benzothiazyl thiohydroxylamine of the structure

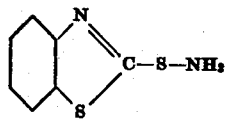

Example 11

An aqueous solution was prepared containing 10 grams of mercaptobenzothiazole, 4.8 grams of sodium hydroxide and 17.5 grams of mixed monobutylamines in a volume of 250 cc. To this solution there was added with stirring 200 cc. of an aqueous potassium iodide solution containing 15.3 grams of free iodine. The product, an amber-colored oil, settled to the bottom. The oil was filtered (in ether solution) and then dried in a vacuum. The oil partially crystallized to a thick paste. The yield was 13.6 grams or 95 per cent of the theoretical. The product is believed to be a mixture of compounds of the structure

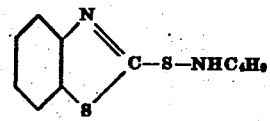

In addition to the mercaptothiazoles disclosed in the above examples, any other mercaptothiazole having the grouping

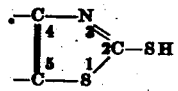

may be employed, examples being 2-mercapto-4-methyl-thiazole, 2-mercapto-4-phenyl-thiazole and aromatic mercaptothiazoles, such as 2-mercapto-benzothiazole, 2-mercapto-4-phenyl-benzothiazole, 2-mercapto-6-phenyl-benzothiazole, 2-mercapto-naphthothiazole and homologues or the various ring substitution products of these substances. As typical ring substituents there may be mentioned nitro, halogen, hydroxyl and alkoxyl groups.

The oxidizing reagent may be employed in a pure form or diluted with an inert material, such as water or air. In the appended claims it is to be understood that a reagent comprising one of the oxidizing substances comprises such substance in the chemical condition indicated and not in a state of chemical combination. Thus, "a reagent comprising chlorine" means a reagent comprising chemically uncombined chlorine.

Modification may be resorted to, and chemical equivalents may be employed, without departing from the spirit of the invention or the scope of the appended claims.

What is claimed is:

1. The process which comprises oxidizing with a substance selected from the group consisting of hypohalous acids and alkali metal and alkaline earth metal salts thereof a mixture of one equivalent of 2-mercaptobenzothiazole and at least 2 equivalents of ethylene diamine, in an aqueous medium comprising at least one equivalent of an alkali, the temperature of said aqueous medium being maintained below 30° C.

2. The process which comprises treating an aqueous solution initially comprising one equivalent of 2-mercaptobenzothiazole, at least two equivalents of an alkali metal hydroxide and at least 2.5 equivalents of cyclohexylamine with a reagent comprising elemental chlorine, the concentration of said cyclohexylamine being maintained in the range of 30 to 100 grams per liter and the temperature of the solution being maintained below 30° C.

3. The process which comprises treating an aqueous solution initially comprising one equivalent of 2-mercaptobenzothiazole, at least two equivalents of an alkali metal hydroxide and at least 2.5 equivalents of cyclohexylamine with a reagent comprising elemental chlorine, the concentration of said cyclohexylamine being maintained in the range of 30 to 100 grams per liter and the temperature of the solution being maintained below 30° C., and gradually adding to the solution further quantities of 2-mercaptobenzothiazole, cyclohexylamine, and sodium hydroxide substantially in the proportion of 1 mole: at least 1 mole: at least 2 moles, respectively, while further treating the solution with the reagent comprising elemental chlorine.

4. The process which comprises oxidizing with a substance selected from the group consisting of hypohalous acids and alkali metal and alkaline earth metal salts thereof, a mixture of one equivalent of 2-mercaptobenzothiazole and at least 2 equivalents of cyclohexylamine, in an aqueous medium comprising at least one equivalent of an alkali, the temperature of said aqueous medium being maintained below 30° C.

5. The process which comprises treating an aqueous solution initially comprising one equivalent of 2-mercaptobenzothiazole at least one equivalent of an alkali and at least two equivalents of cyclohexylamine with a reagent comprising a substance selected from the group consisting of chlorine, bromine, iodine, hypochlorous acid, hypobromous acid, hypoiodous acid, and alkali metal and alkaline earth metal salts of said acids, the temperature of the solution being maintained below 30° C., and gradually adding to the solution further quantities of 2-mercaptobenzothiazole, cyclohexylamine, and an alkali substantially in the proportion of 1 mole: at least 1 mole: at least 1 mole, respectively, while further treating the solution with said reagent.

6. The process which comprises treating an aqueous solution comprising one equivalent of a 2-mercaptothiazole, at least one equivalent of an alkali and at least two equivalents of an ammonia derivative selected from the group consisting of ammonia, primary alkyl amines, primary cyclo-aliphatic amines, primary aralkyl amines, and primary poly-amines with a reagent comprising a substance selected from the group consisting of chlorine, bromine, iodine, hypochlorous acid, hypobromous acid, hypoiodous acid, and alkali metal and alkaline earth metal salts of said acids, the temperature of the solution being maintained below 30° C.

7. The process which comprises treating an aqueous solution initially comprising one equivalent of a 2-mercaptothiazole, at least one equivalent of an alkali and at least two equivalents of an ammonia derivative selected from the group consisting of ammonia, primary alkyl amines, primary cyclo-aliphatic amines, primary aralkyl amines and primary poly-amines with a reagent comprising a substance selected from the group consisting of chlorine, bromine, iodine, hypochlorous acid, hypobromous acid, hypoiodous acid, and alkali metal and alkaline earth metal salts of said acids, the temperature of said solution being maintained below 30° C., and gradually adding to the solution further quantities of said 2-mercaptothiazole, said ammonia derivative, and an alkali substantially in the proportion of 1 mole: at least 1 mole: at least 1 mole, respectively, while further treating the solution with said reagent.

8. The organic reaction product containing both nitrogen and sulfur made by the process of claim 1.

EDWARD L. CARR.